(12) United States Patent
Isomura et al.

(10) Patent No.: US 7,616,900 B2
(45) Date of Patent: Nov. 10, 2009

(54) OPTICAL SIGNAL DEGRADATION COMPENSATOR

(75) Inventors: Akihiko Isomura, Kawasaki (JP); Jens C. Rasmussen, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 10/898,286

(22) Filed: Jul. 26, 2004

(65) Prior Publication Data

US 2005/0201758 A1 Sep. 15, 2005

(30) Foreign Application Priority Data

Mar. 9, 2004 (JP) ............... 2004-066193

(51) Int. Cl.
*H04B 10/00* (2006.01)
(52) U.S. Cl. ...................... 398/158; 398/152
(58) Field of Classification Search ............... 398/158, 398/147–150, 81, 152; 385/11
See application file for complete search history.

(56) References Cited

U.S. PATENT DOCUMENTS

| | | | | |
|---|---|---|---|---|
| 6,266,457 | B1 * | 7/2001 | Jacob | 385/11 |
| 6,339,489 | B1 * | 1/2002 | Bruyere et al. | 398/147 |
| 6,882,760 | B2 * | 4/2005 | Takabayashi et al. | 385/11 |
| 7,088,925 | B1 * | 8/2006 | Noe | 398/147 |
| 2001/0008452 | A1 * | 7/2001 | Sugihara et al. | 359/124 |
| 2002/0159701 | A1 | 10/2002 | Katayama et al. | |
| 2003/0002112 | A1 * | 1/2003 | Hirano et al. | 359/161 |
| 2004/0131298 | A1 * | 7/2004 | Rasmussen et al. | 385/11 |
| 2006/0263094 | A1 * | 11/2006 | Setti et al. | 398/152 |

FOREIGN PATENT DOCUMENTS

| | | |
|---|---|---|
| JP | 7-177088 | 7/1995 |
| JP | 11-196046 | 7/1999 |
| JP | 2000-507430 | 6/2000 |
| JP | 2000-330079 | 11/2000 |
| JP | 2001-44937 | 2/2001 |

(Continued)

OTHER PUBLICATIONS

N. Kikuchi, "Analysis of Signal Degree of Polarization Degradation Used as Control Signal for Optical Polarization Mode Dispersion Compensation", Journal of Lightwave Technology, vol. 19, No. 4, pp. 480-486 Apr. 2001.

(Continued)

*Primary Examiner*—Quan-Zhen Wang
(74) *Attorney, Agent, or Firm*—Staas & Halsey LLP

(57) ABSTRACT

By comprising a unit 2 making the adjustment related to degradation compensation of a plurality of signals with each wavelength made after multiplexing the signals, a unit 3 multiplexing the outputs of a plurality of units 2, a unit 4 compensating for the waveform degradation of the output of the unit 3, a unit 5 selecting a component with one of a plurality of wavelengths from a part of the output of the unit 4 and a unit 6 detecting the degree of signal degradation from the output of the unit 5 and controlling the adjustment by the unit 2 corresponding to the selected frequency so as to reduce the degree, components disposed for each wavelength in an optical transmission system adopting a wavelength-division multiplexing method can be shared, and the size and cost of an compensator can be reduced.

10 Claims, 17 Drawing Sheets

FOREIGN PATENT DOCUMENTS

| | | |
|---|---|---|
| JP | 2001-53680 | 2/2001 |
| JP | 2001-136125 | 5/2001 |
| JP | 2001-186084 | 7/2001 |
| JP | 2001-203637 | 7/2001 |
| JP | 2002-208892 | 7/2002 |
| JP | 2002-303805 | 10/2002 |
| JP | 2003-233045 | 8/2003 |
| JP | 2003-298515 | 10/2003 |

OTHER PUBLICATIONS

H. Ooi, et al., "40-Gbit/s automatic polarization-mode dispersion compensation experiments", IEICE, OCS99-99, OPE99-103, LQE99-100, pp. 79-84 Nov. 1999.

Notice of Rejection for corresponding Japanese Application 2004-066193; dated Mar. 31, 2009.

* cited by examiner

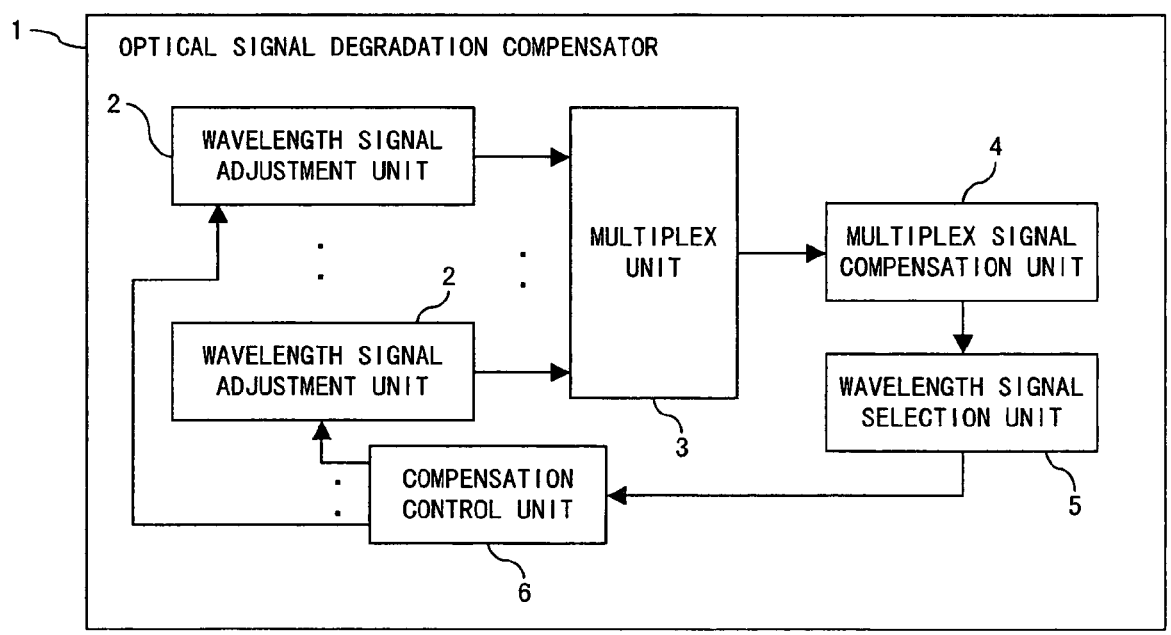
F I G. 1

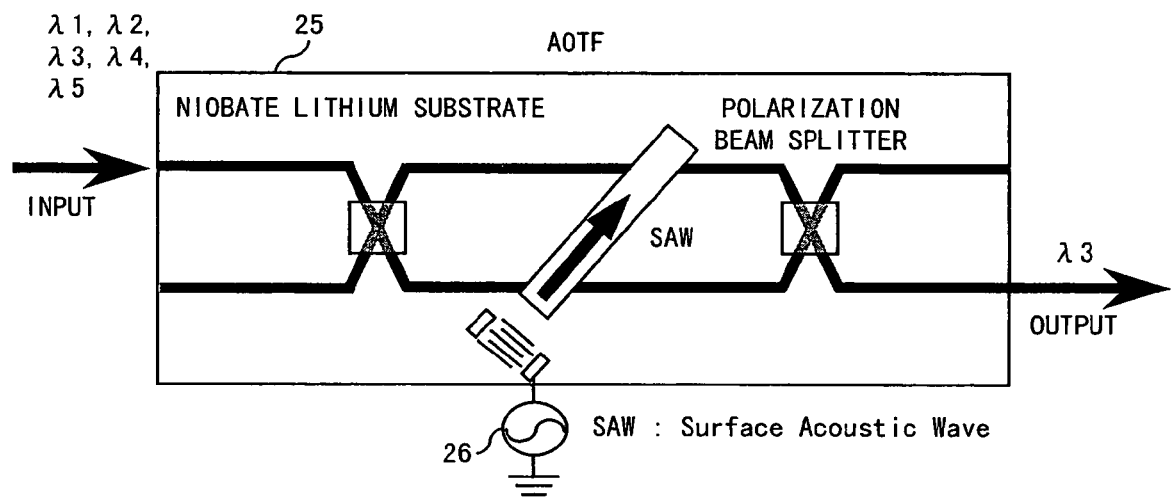
F I G. 6

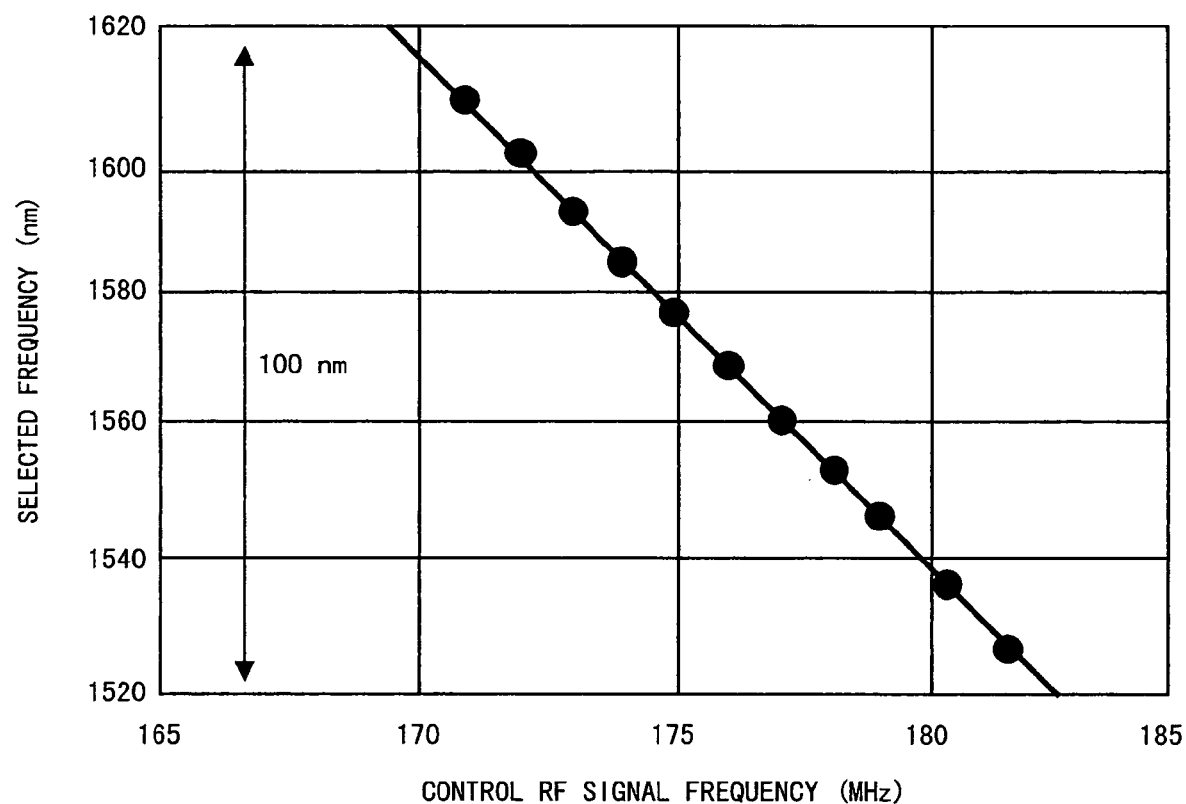
F I G. 7

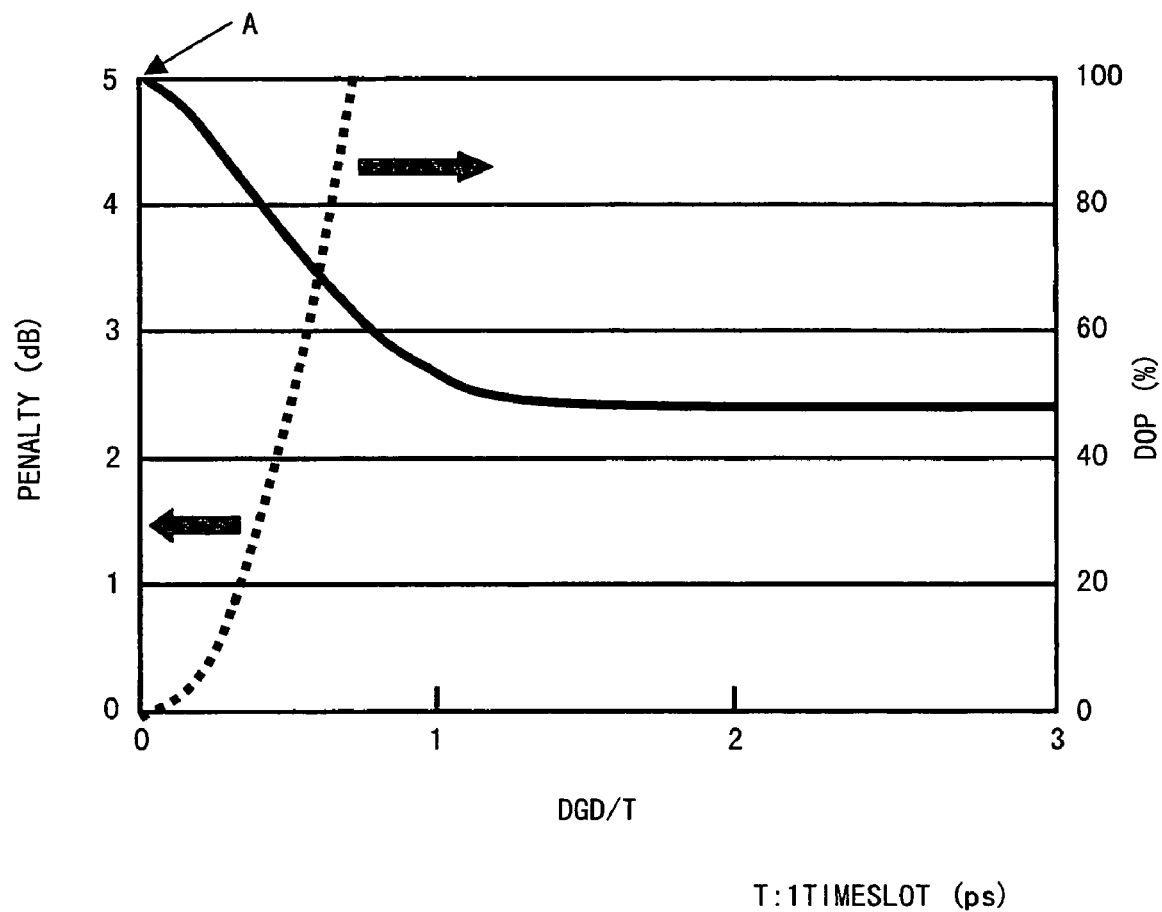
F I G. 1 0

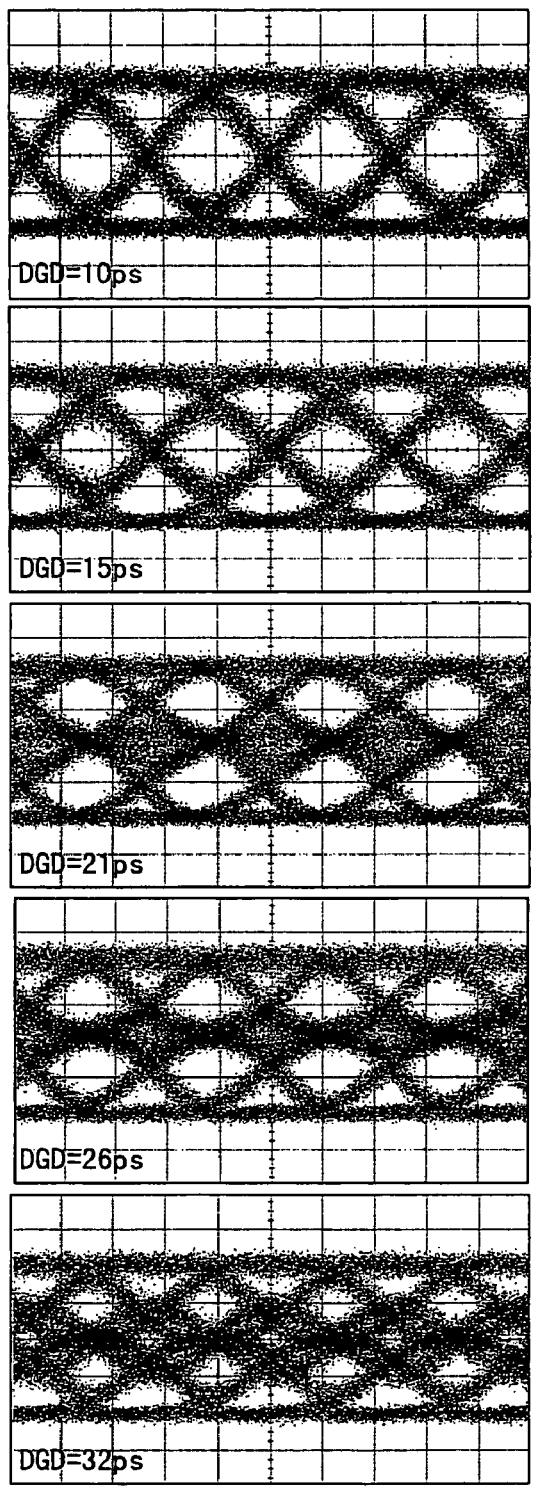
F I G. 1 1

OPTICAL SIGNAL DEGRADATION COMPENSATOR

BACKGROUND OF THE INVENTION

1. Field of the Invention

The present invention relates to the degradation compensation method for optical signals, and more particularly it relates to a device for compensating for the degradation of a signal waveform in an optical transmission line, and especially a polarization mode dispersion compensator for compensating for the degradation of an optical signal waveform, due to polarization mode dispersion in high-speed transmission or long-haul transmission.

2. Description of the Related Art

Lately, with the spread of the Internet, the transfer capacity of data using optical signals has increased, and a wavelength-division multiplexing (WDM) technology for realizing high-speed large-capacity communication has been introduced. However, for example, in an optical transmission system with a transfer rate of 40 Gbit/s or more, polarization mode dispersion (PMD) is one of important factors that restrict transmission coverage.

Since the core of a general single mode fiber (SMF) is not truly circular and slightly elliptical, birefringence is generated. An optical signal that is doubly refracted and inputted to a fiber is split into two orthogonal polarization mode components, that is, a fast-wave axis and a slow-wave axis. Since the polarization mode components differ in transfer rate, differential group delay (DGD) is caused. The differential group delay caused between modes after an optical signal goes through a birefringence medium including a fiber is called polarization mode dispersion.

Although a SMF with an ideally true circular core does not cause polarization mode dispersion, the core of an actual fiber causes slight distortion, that is, birefringence in its actual manufacturing process or due to a variety of stress (such as change in temperature, binding, twist, tension, etc.). PMD has almost no correlations with a wavelength and varies with the environmental change of a transmission line, such as temperature, stress or the like, as time elapses.

The PMD value of a laid fiber is proportional to the square root of distance. It is generally said that an old fiber laid overseas has a large PMD value per unit length, such that exceeds 0.2 to 2 ps/$\sqrt{km}$, and the transmission coverage in 40 Gbit/s transmission is restricted to 3 to 50 km (if it is assumed that the worst PMD value is three times as much as an average). For example, even in a system with a transfer rate of 10 Gbit/s, waveform degradation due to PMD cannot be neglected in super-long haul transmission of several thousands or more of kilometers, and in 40 bit/s or more super-high speed communication or a super-long haul distance system, an automatic PMD compensation technology for disposing a PMD compensator in the relay node of a transmission line is needed.

As such a prior art for compensating for the degradation of optical signals in a transmission line, Japanese Patent Laid-open Application Nos. 2001-53680 "Dispersion Compensator", 2001-186084 "Optical Transmitting Terminal System for Optical Wavelength Division Multiplexing", 2002-303805 "Variable-Dispersion Compensator and Optical Transmission System" and 2003-233045 "Polarization Control Device and Differential Delay Time Compensation Device" are disclosed.

In Japanese Patent Laid-open Application No. 2001-53680, if the wavelength dispersion of WDM optical signals covering a wide-range wavelength band is compensated for using a plurality of fiber gratings, the optical characteristic of an optical signal after compensation can be improved by setting so that each of a plurality of wavelengths obtained by demultiplexing input light may be the center frequency of the reflection wavelength of each of a plurality of dispersion compensation fiber gratings.

In Japanese Patent Laid-open Application No. 2001-186084, an optical communication terminal system is disclosed in which the number of devices can be reduced by partially sharing accumulated wavelength dispersion compensation devices provided for each channel in an optical transmitting terminal for optical wavelength division multiplexing.

In Japanese Patent Laid-open Application No. 2002-303805, a variable chromatic dispersion compensator is disclosed in which dispersion caused in signal light can be compensated for with high accuracy by using a movable mirror whose reflection position is variable, as a reflection mirror when reflecting each frequency component obtained as a result of demultiplexing signal light whose wavelength dispersion should be compensated for, by a corresponding reflection mirror and giving a predetermined phase shift.

In Japanese Patent Laid-open Application No. 2003-233045, a polarization dispersion compensation device is disclosed in which both a polarization control function to control a polarization state in order to compensate for polarization mode dispersion and a differential delay compensation function to compensate for differential group delay can be realized on one bulk device.

However, the technologies disclosed by Japanese Patent Laid-open Application Nos. 2001-53680, 2001-186084 and 2002-303805 do not compensate for polarization mode dispersion targeted by the present invention, and compensates for only simple-wavelength dispersion. Therefore, the technologies cannot compensate for polarization mode dispersion, which is a problem. The technology disclosed by Japanese Patent Laid-open Application No. 2003-233045 should be basically applied to an optical signal with a single wavelength, and if optical signals with a lot of wavelengths are multiplexed and transferred in a wavelength-division multiplexing method, a number equal to the number of the wavelengths, of polarization dispersion compensation devices are needed, which is another problem.

Next, the prior art of a polarization mode dispersion compensator is further described with reference to FIGS. 15 through 17. FIG. 15 is a block diagram showing the conventional configuration of a polarization mode dispersion compensator. In FIG. 15, optical signals are supplied from a transmission line 100 to a polarization controller 101. The polarization controller 101 adjusts the polarization state of each input optical signal and reshapes its optical waveform. The output is supplied to a DGD compensation unit 102. The DGD compensation unit 102 compensates for differential group delay by providing differential delay basically the reversal of the differential group delay caused in the transmission line 100 to compensate for the degradation of an optical signal waveform.

The output of the DGD compensation unit 102 is partially demultiplexed by a coupler 103 and is supplied to a PMD monitor 104. The PMD monitor 104 detects a polarization mode dispersion value contained in the output of the DGD compensation unit 102. The polarization mode dispersion is detected, for example, as a value indicating the degree of polarization (DOP) is supplied to a control circuit 105, and polarization mode dispersion detected by the PMD monitor 104 can be reduced by the control, circuit 105 controlling the polarization state of the polarization controller 101.

FIG. 16 explains polarization mode dispersion due to differential group delay (DGD). In FIG. 16, when an optical signal is inputted to an optical fiber, the optical signal is split into a fast wave axis component and a slow wave axis component by the differential group delay. The left side drawing shows both the waveform and combined vector of an optical signal when there is no DGD. When there is no DGD, the fast wave axis component and slow wave axis component have the same speed, and as a result, the combined vector faces the same direction at any time. This state corresponds to a state in which the degree of polarization is 100%. However, if there is DGD as shown in the right side drawing, the speed of the fast wave axis component and that of the slow wave axis component are different, and its combined vector faces a variety of directions depending on a clock time. As a result, its degree of polarization becomes less than 100%.

FIG. 17 is a block diagram showing the conventional configuration of a polarization mode dispersion compensator for input optical signals transmitted in a wavelength-division multiplexing method. In FIG. 17, an optical signal inputted from a transmission line is demultiplexed into multiplexed signals with each wavelength, by a demultiplexer 110 and each of the demultiplexed signals is inputted to a polarization controller 111. As in shown is FIG. 15, polarization mode dispersion compensation is applied to each wavelength component by a polarization controller 111, a DGD compensation unit 112 and a PMD monitor 114 (including a controller), and optical signals with each wavelength, after compensation, are multiplexed and outputted by a multiplexer 115.

However, in such prior arts or if the technology disclosed by Japanese Patent Laid-open Application No. 2003-233045 is used, in a wavelength-division multiplex transmission system, a PMD compensator must be disposed for each wavelength, that is, channel. For example, in FIG. 17, a polarization controller, a DGD compensation unit and a PMD monitor must be disposed for each wavelength, and, for example, the size and cost of a relay node in a transmission line, in which a polarization mode dispersion compensator is disposed, increases, which is a problem.

SUMMARY OF THE INVENTION

It is an object of the present invention to reduce the size and cost of a polarization mode dispersion compensator by sharing components disposed for each wavelength in an optical transmission system using a wavelength-division multiplexing method in order to solve the problem described above.

In order to achieve the above object, the optical signal degradation compensator of the present invention comprises a plurality of wavelength signal adjustment units making the adjustment related to waveform degradation compensation made after multiplexing a plurality of wavelength signals, of an optical signal with a plurality of wavelengths, a multiplex unit multiplexing the outputs of the plurality of wavelength signal adjustment units, a multiplex signal compensation unit compensating for the waveform degradation of a signal outputted by the multiplex unit, a wavelength signal selection unit selecting a component with one of the plurality of wavelengths from a part of the output of the multiplex signal compensation unit and a compensation control unit detecting the degree of waveform degradation of an optical signal from the output of the wavelength signal selection unit and controlling the adjustment by the wavelength signal adjustment unit corresponding to the selected wavelength so as to reduce the degradation.

BRIEF DESCRIPTION OF THE DRAWINGS

FIG. 6 shows the configuration of an AOTF (absolute optical tunable filet) as a wavelength variable filter;

FIG. 7 shows the relationship between a control signal frequency and a selected wavelength in the AOTF shown in FIG. 6;

FIG. 10 explains an optical signal waveform compensation method using the DOP monitor;

FIG. 11 explains the change of a optical signal waveform, corresponding to a DGD value;

FIG. 15 is a block diagram showing the conventional configuration of a PMD compensator for a single wavelength optical signal;

DESCRIPTION OF THE PREFFERED EMBODIMENTS

Figure 1:
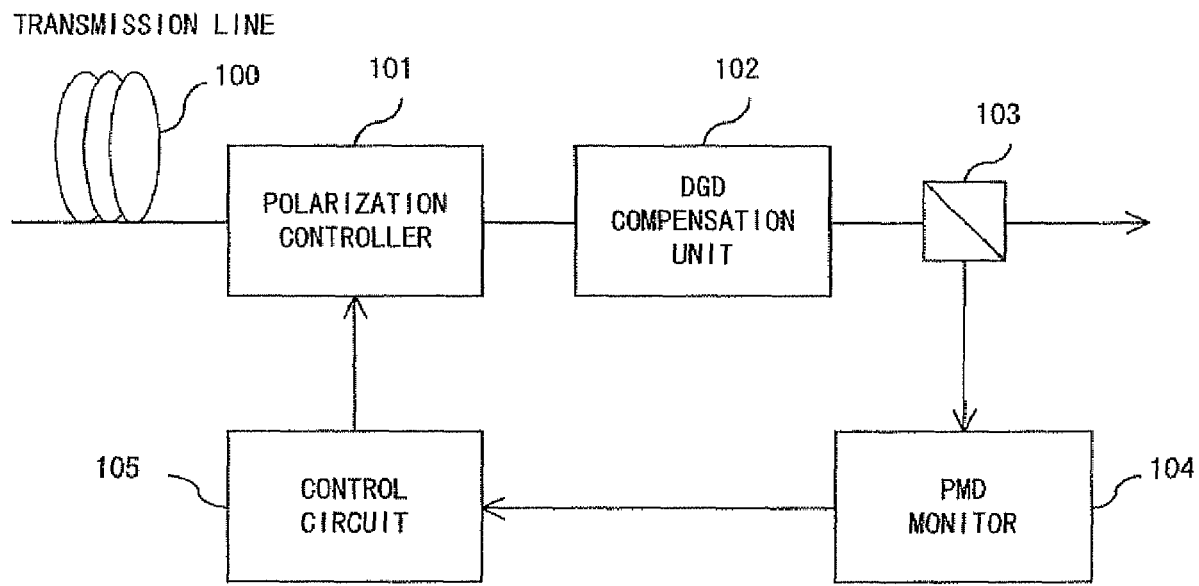
FIG. 1 is a block diagram showing the basic configuration of the optical signal degradation compensator of the present invention.
Figure 16:
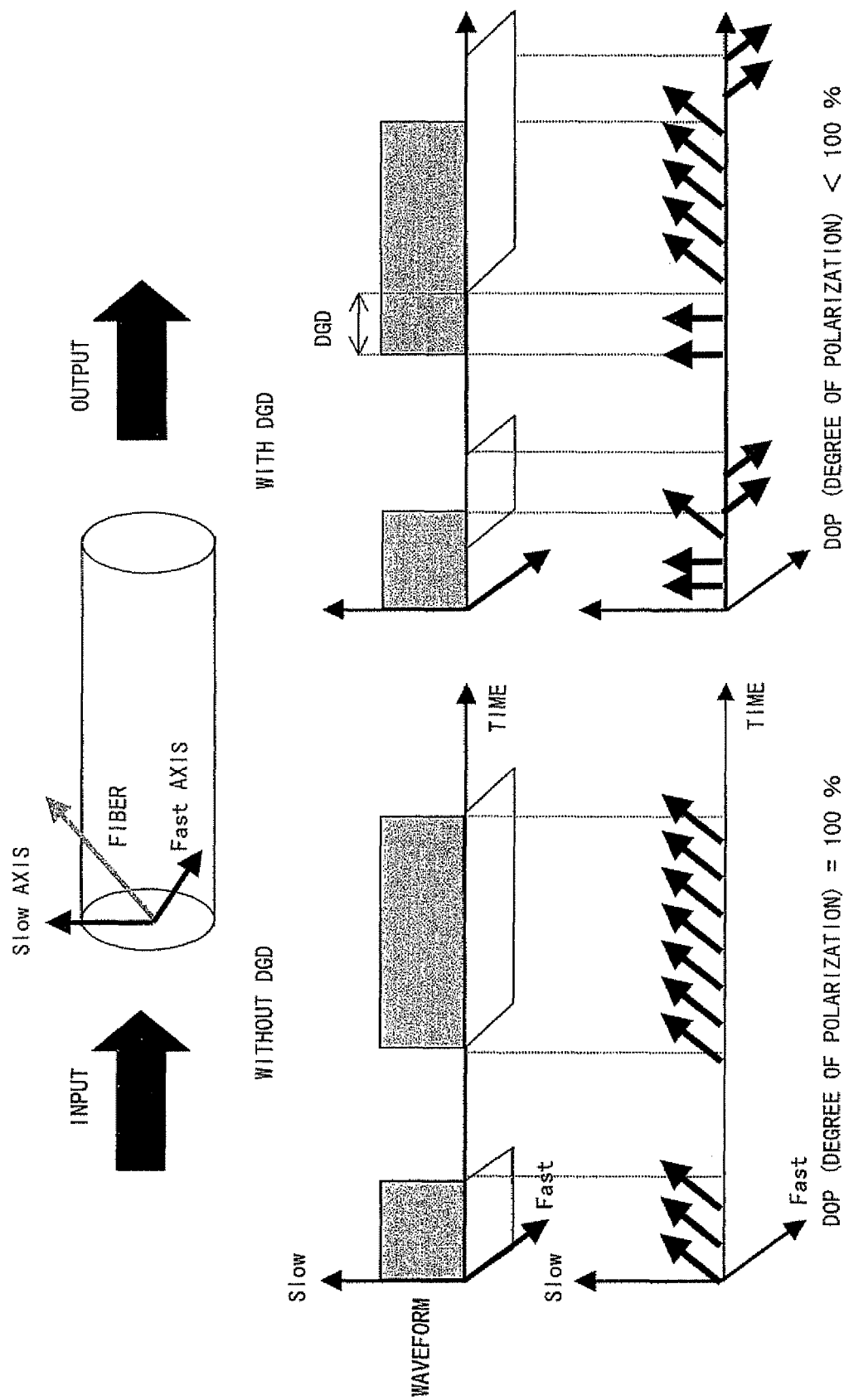
FIG. 16 explains the relationship between differential group delay and polarization mode dispersion.

FIG. 1 is a block diagram showing the basic configuration of the optical signal degradation compensator of the present invention. In FIG. 1, an optical signal degradation compensator 1 is, for example, a polarization mode dispersion compensator. The optical signal degradation compensator 1 comprises a plurality of wavelength signal adjustment units 2, a multiplex unit 3, a multiplex signal compensation unit 4, a wavelength signal selection unit 5 and a compensation control unit 6.

The plurality of wavelength signal adjustment unit 2 makes the adjustment related to waveform degradation compensation made after multiplexing the plurality of wavelength signals of each of the plurality of optical signals each with a different wavelength, and the multiplex unit 3 multiplexes the outputs of the plurality of wavelength signal adjustment units 2. The wavelength signal adjustment unit 2 is, for example, a polarization controller.

The multiplex signal compensation unit 4 compensates for the waveform degradation of a multiplexed signal outputted by the multiplex unit 3, and, is, for example, a differential group delay compensation unit. The wavelength signal selection unit 5 selects a component with one of a plurality of wavelengths from a part of the output of the multiplex signal compensation unit 4, and is, for example, composed of a photo-coupler and a wavelength-variable filter.

The compensation control unit 6 detects the degree of degradation of a wavelength from the output of the wavelength signal selection unit 5, that is, an optical signal with the selected wavelength, and makes adjustment by the wavelength signal adjustment unit 2, such as a polarization controller, corresponding to the selected wavelength so as to reduce the degree of degradation. The compensation control unit 6 is, for example, composed of PMD monitors (including a control circuit). If the PMD monitor is used, the compensation control unit 6 detects polarization mode dispersion as the degree of waveform degradation of an optical signal, and controls the wavelength signal adjustment unit 2 so as to reduce a polarization mode dispersion value.

Alternatively, the preferred embodiment of the present invention can further comprise a demultiplex unit demultiplexing a signal in which the plurality of optical signals with each wavelength is multiplexed or synthesized into optical signals with each wavelength, and supply each of the signals to each of the plurality of wavelength signal adjustment unit 2.

Alternatively, in the preferred embodiment of the present invention, for the multiplex signal compensation unit 4, such as a DGD compensation unit compensating for differential group delay between polarization mode components, a polarization maintaining fiber (PMF), a birefringence plate, or a differential group delay compensation unit composed of a demultiplex beam splitter splitting a signal into two orthogonal polarization mode components, a differential line generating a fixed differential delay between the split polarization components and a polarization multiplexers connected to the output unit of a line can be used.

Furthermore, alternatively, the preferred embodiment of the present invention can use a DOP monitor, a monitor detecting waveform degradation using the strength of an optical signal component with a specific frequency or a monitor detecting a bit error rate, as the PMD monitor constituting the compensation control unit 6.

According to the present invention, in a super-high speed or a super-long haul optical transmission system, the number of devices needed to build an optical signal degradation compensator, such as a polarization mode dispersion compensator, and a lot of small inexpensive polarization mode dispersion compensators can be disposed in a transmission line. Accordingly, the reliability of an optical transmission system can be greatly improved.

Figure 2:
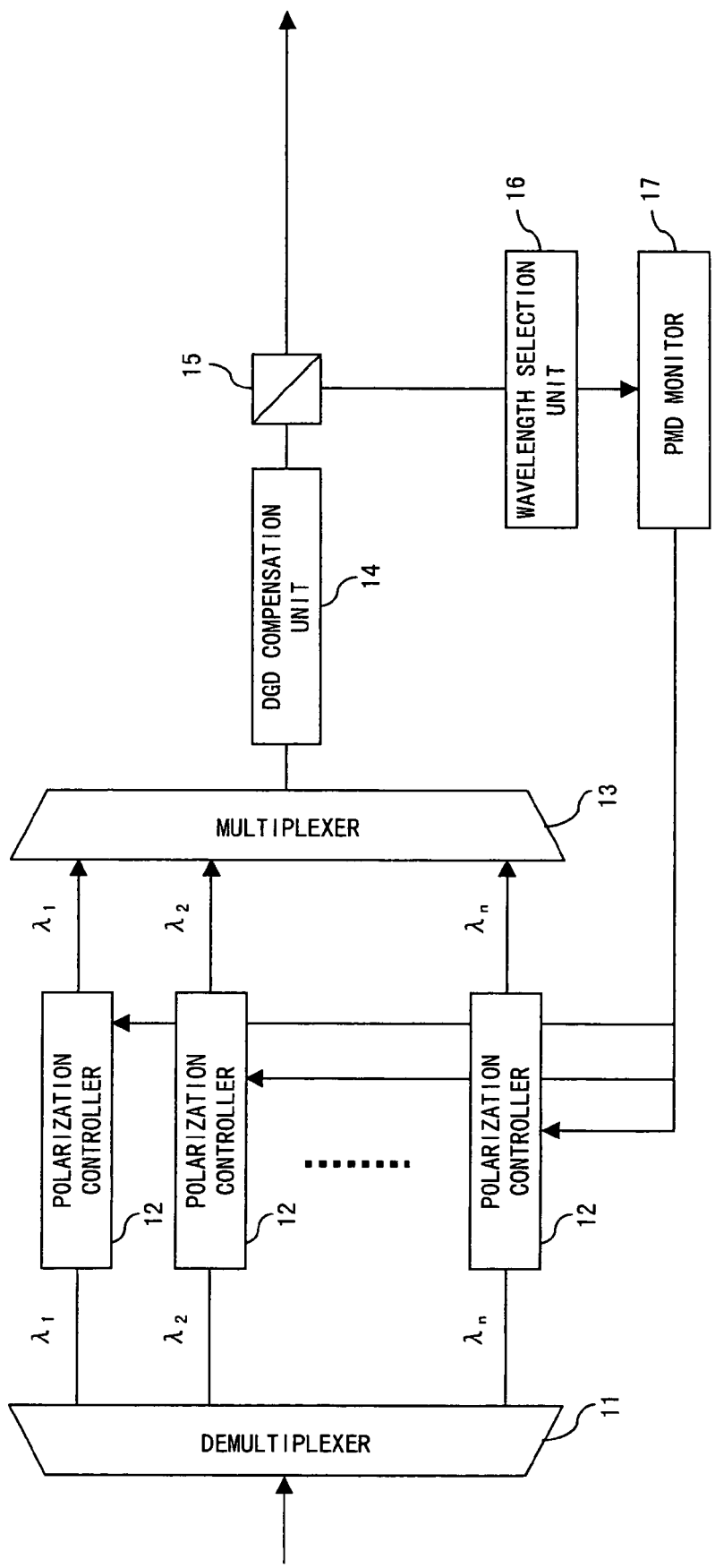
FIG. 2 is a block diagram showing the configuration of the polarization mode dispersion compensator in the preferred embodiment.

FIG. 2 is a block diagram showing the basic configuration of the polarization mode dispersion (PMD) compensator of the present invention. In FIG. 2, the PMD compensator, for example, comprises a demultiplexer 11 demultiplexing an optical signal, such as a wavelength-division multiplex signal whose waveform is degraded in a transmission line into optical signals with each of wavelengths, $\lambda_1, \lambda_2, \ldots, \lambda_n$, a polarization controller 12 controlling the polarization state of the optical signal with each wavelength, a multiplexer 13 multiplexing the outputs of the polarization controllers 12, a differential group delay (DGD) compensation unit 14 adjusting the differential group delay of the output of the multiplexer 13, a demultiplexer 15, such as a coupler, demultiplexing the output of the DGD compensation unit 14, a wavelength selection unit 16 selecting a component with one of the plurality of wavelengths, $\lambda_1, \lambda_2, \ldots, \lambda_n$ corresponding to each polarization controller 12 from the output of the demultiplexer 15, and a PMD monitor 17 calculating a PMD (polarization mode dispersion) value, based on the output of the wavelength selection unit 16 and controlling the polarization controller 12 corresponding to the selected wavelength so that the PMD value may approach 0.

For the polarization controller 12 shown in FIG. 2, a variety of devices can be used. This polarization controller 12 can arbitrarily change the polarization state of a single-wavelength optical signal to be inputted. As one of those devices, an LN type polarization controller is used. This polarization controller uses niobate lithium $LiNbO_3$. $LiNbO_3$ or the like is embedded in a substrate in order to form an optical wave path, the optical path inserted between electrodes, and polarization is controlled using an electro-optical effect generated by applying voltage to the electrodes.

As the second example of the polarization controller, an LC (liquid crystal) is used. Molecule array can be changed by applying voltage to the LC, and polarization can be controlled by rotating it along the molecule array.

As the third example, a piezoelectric device is used. The core of a fiber is deformed by adjusting voltage applied to the piezoelectric device and applying pressure to the fiber. Thus, polarization is controlled. Thus, a variety of devices can be used for the polarization controller. However, since this polarization controller itself has no direct connection with the present invention, its detailed description is omitted here.

Figure 3:
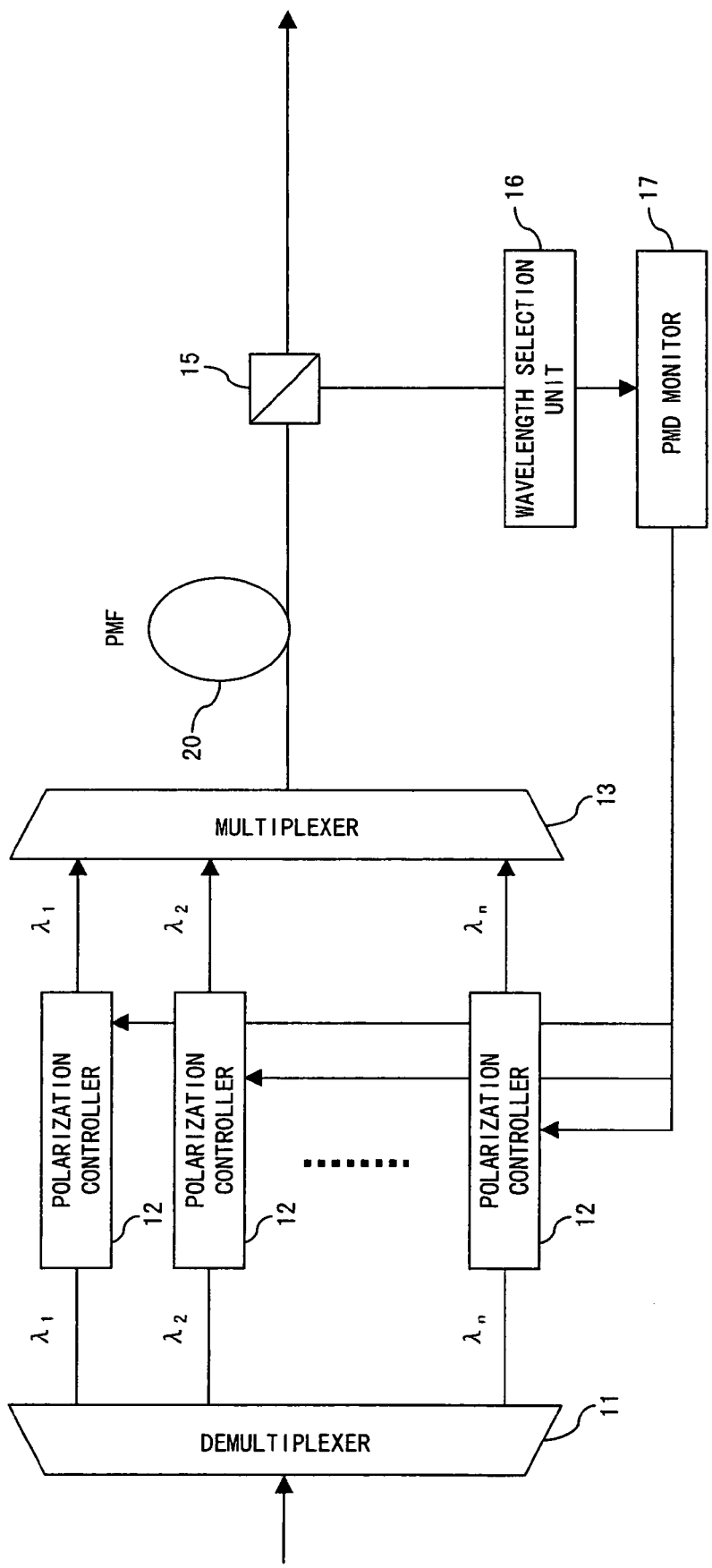
FIG. 3 is a block diagram showing the configuration of the first preferred embodiment of the polarization mode dispersion compensator.

In this preferred embodiment, a variety of compensation units can be used as the DGD compensation unit 14 shown in FIG. 2. FIG. 3 is a block diagram showing the configuration of the first preferred embodiment of the polarization mode dispersion compensator, which uses a polarization maintaining fiber (PMF) as this compensation unit.

Differential group delay caused in a transmission line can be compensated for by controlling it so as to input the fast polarization mode component of the output of the multiplexer 13 to a slow propagation shaft.

Figure 4:
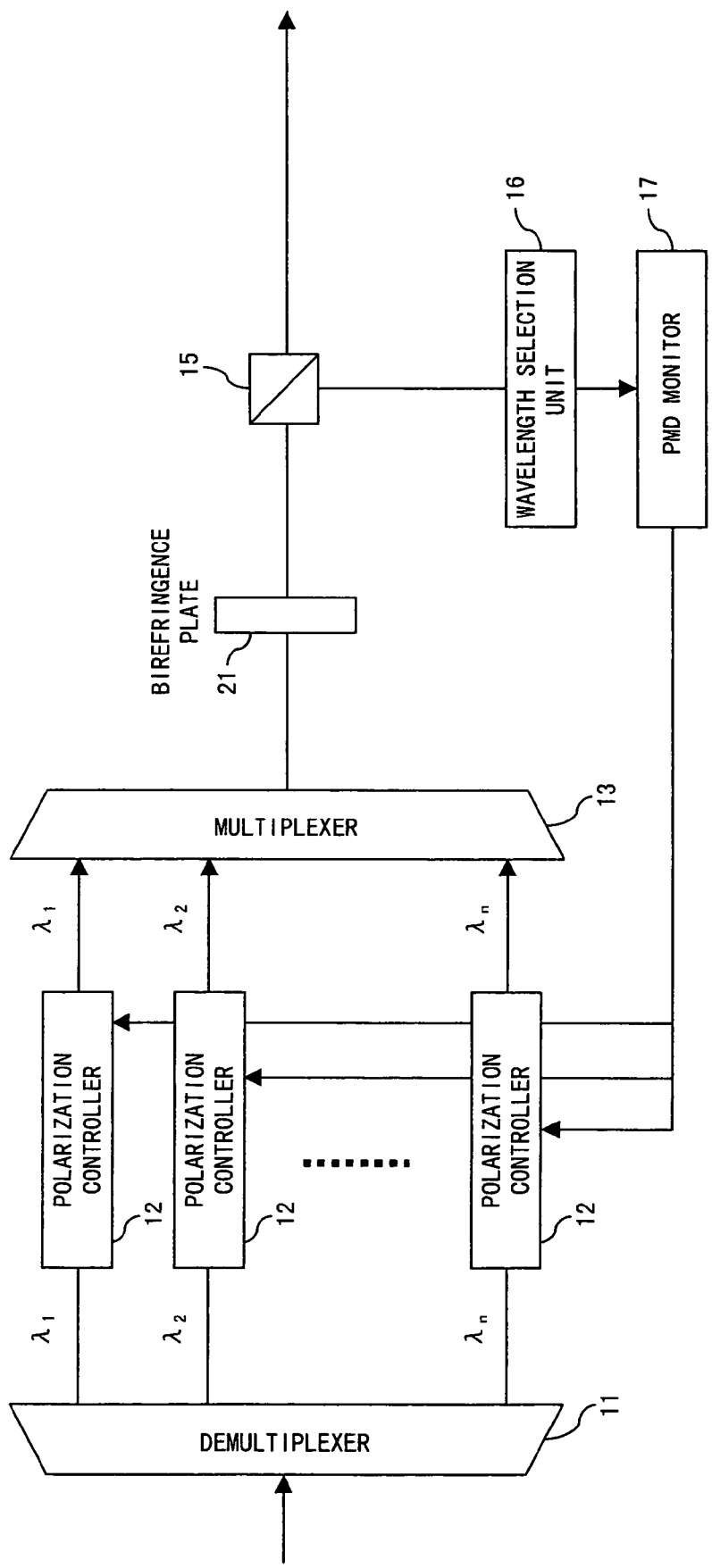
FIG. 4 is a block diagram showing the configuration of the second preferred embodiment of the polarization mode dispersion compensator.

FIG. 4 is a block diagram showing the configuration of the second preferred embodiment of the polarization mode dispersion compensator, which uses a birefringence plate 21 as the DGD compensation unit 14. For the birefringence plate 21, $YVO_4$, $LiNbO_3$, $TiO_2$, $CaCO_3$ or the like can be used. However, other crystals having a birefringence can also be used. Differential group delay caused in a transmission line can be compensated for by controlling so as to input the fast polarization mode component to a slow propagation shaft.

Figure 5:
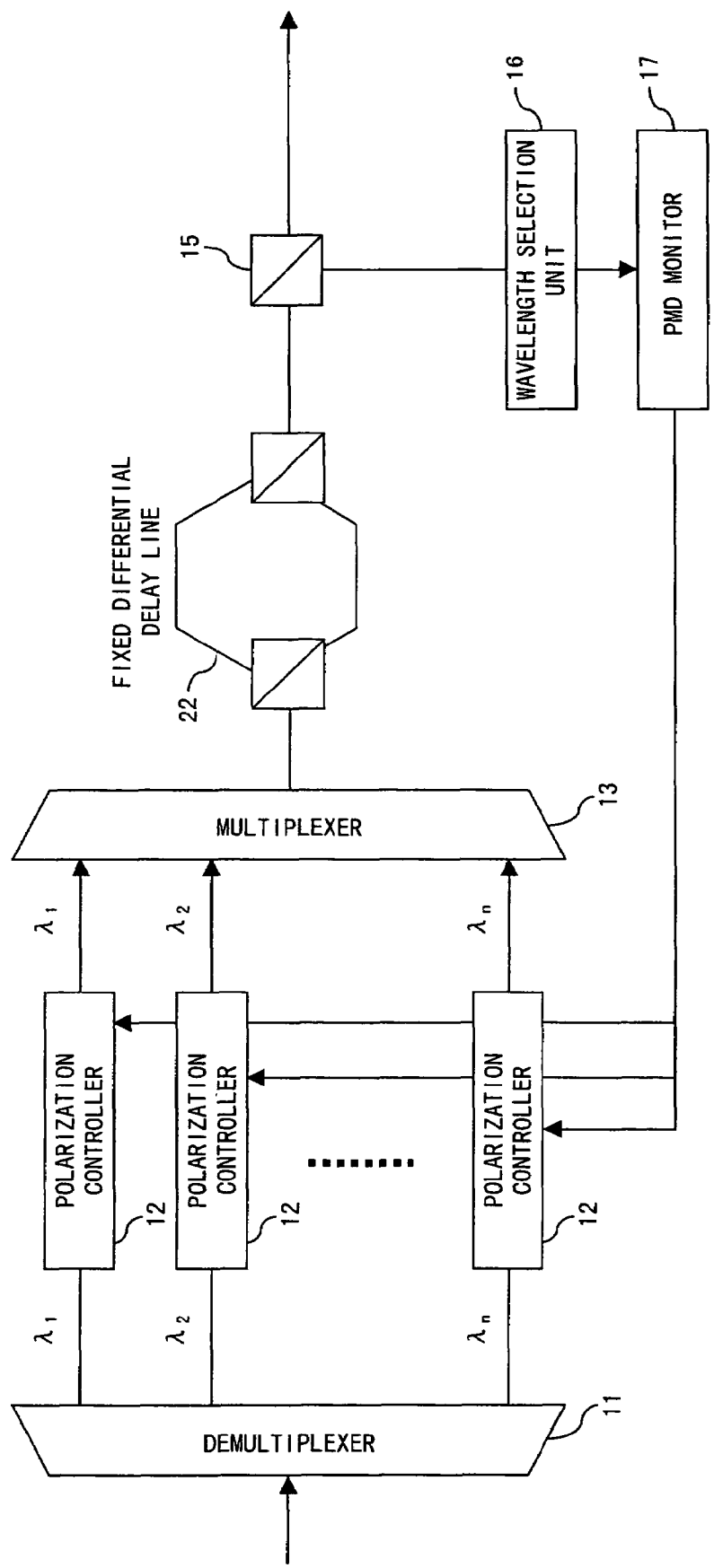
FIG. 5 is a block diagram showing the configuration of the third preferred embodiment of the polarization mode dispersion compensator.

FIG. 5 is a block diagram showing the configuration of the third preferred embodiment of the polarization mode dispersion compensator, which uses a fixed differential delay line 22 as the DGD compensation unit 14. In this fixed differential delay line 22, a signal outputted from the multiplexer 13 is split into two polarization mode components by a polarization beam splitter on the input side. When each of the two split polarization components passes through an optical path with a different distance, the differential delay the reversal of the differential group delay due to the polarization mode dispersion of the optical signal, corresponding to degradation in a transmission line is generated, and the differential group delay is compensated for. On the output side of the fixed differential delay line, the two polarization mode components are combined by a polarization multiplexer.

Next, the respective configurations of the wavelength selection unit 16 and PMD monitor 17 shown in FIG. 2, which are common for all the preferred embodiments, are described. FIG. 6 explains an AOTF corresponding to the wavelength selection unit 16. By inputting a control RF signal frequency to an AOTF 25, using an oscillator 26, the refractive index of a crystal grating changes, and the crystal grating acts as a diffraction grating. Thus, the crystal grating acts as a band-pass filter. Therefore, by inputting a wavelength-division multiplex signal, an arbitrary signal can be extracted from the signal.

FIG. 7 shows an example of a wavelength selected corresponding to this control RF signal frequency. The wavelength selection unit 16 is not limited to this AOTF, and any filter that can extract arbitrary single-wavelength light from a plurality of wavelengths, can be used for it.

Figure 8:
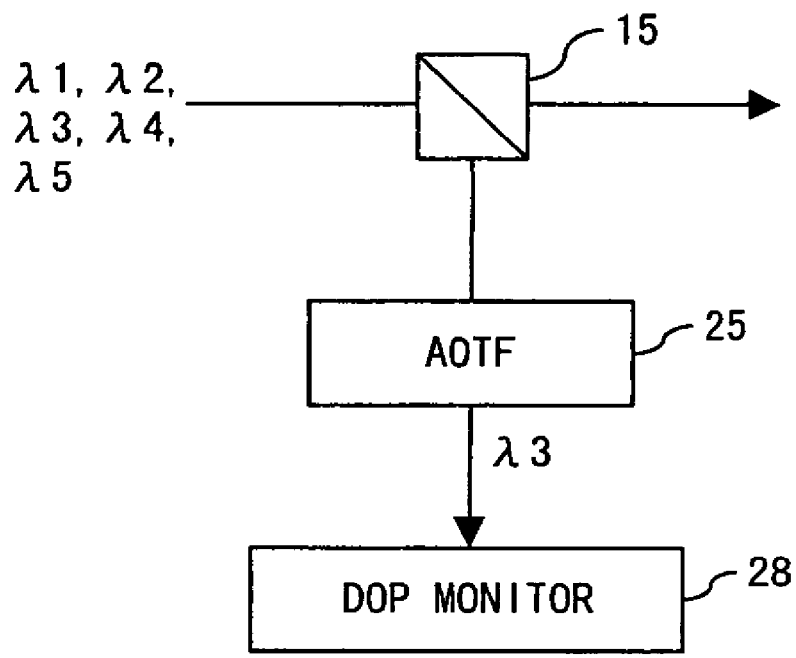
FIG. 8 shows the connection of a DOP (degree of polarization) monitor used as a PMD monitor.

FIGS. 8 through 11 explain the configuration and operation of a DOP monitor using a DOP value, as the PMD monitor 17 shown in FIG. 2. FIG. 8 shows the connection of the DOP monitor. Light with single-wavelength $\lambda_3$ that is extracted by the coupler 15 shown in FIG. 2 and the AOTF 25 shown in FIGS. 6 and 7, is inputted to the DOP monitor 28.

DOP detected by the DOP monitor 28 indicates a ratio of optically polarized power to the overall average of optical signal power, and the ratio of a polarized output to a total output is indicated by percentage. No high-speed electrical circuit is needed to detect DOP, and a value that does not depend on the bit rate of an optical signal is obtained. For the control of polarization mode dispersion by the detection of this DOP, see the following reference.

N. Kikuchi, "Analysis of Signal Degree of Polarization Degradation Used as Control Signal for Optical Polarization Mode Dispersion Compensation", Journal of Light-wave Technology, Vol. 19, No. 4, pp. 480-486 (April 2001)

Figure 9:
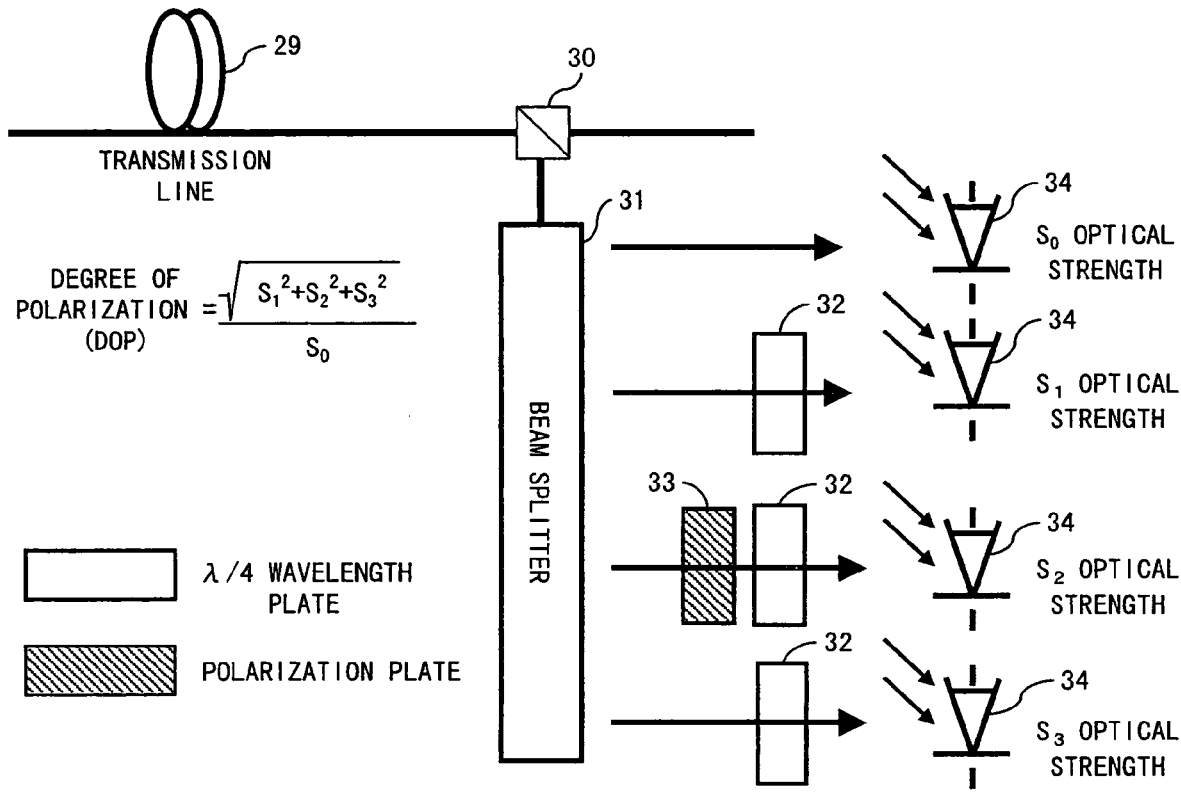
FIG. 9 explains the DOP detection method of the DOP monitor.

FIG. 9 shows an example of the configuration of this DOP monitor. In FIG. 9, an optical signal outputted from a transmission line 29 is demultiplexed by a coupler 30, and is inputted to a beam splitter 31. Each of four optical signals split by the beam splitter 31 is inputted to each of four photo-diodes 34 without going through any device or through a $\lambda/4$ wavelength plate 32, a polarization plate 33 and the like, and is converted into an electrical signal. Optical signal powers, $S_0$ through $S_3$ are calculated based on the respective values of the electrical signals, and their DOP are calculated based on the respective power values according to the following equation. In. FIG. 9, the $\lambda/4$ wavelength plate 32 is installed perpendicularly to the travel direction of light in order to obtain $S_1$. In order to obtain $S_3$, the plate 32 is installed at 45° or 135° against the travel direction of light.

FIGS. 10 and 11 explain the degradation compensation of an optical signal waveform, using the DOP. FIG. 10 shows the relationship between DOP/penalty and DGD/T. The horizontal value indicates a ratio between a DGD value and one time slot T of an optical signal. For example, in a 40 Gbit/s optical signal, a value for one time slot is 25 ps, and when a DGD value is 25 ps, its horizontal value is 1.

The larger a DOP value, the smaller its polarization mode dispersion, that is, waveform degradation due to PMD. Although waveform degradation is indicated by penalty, this penalty indicates extra optical strength, for example, needed to make a bit value equivalent to a bit error value obtained when there is no waveform degradation due to PMD. Thus, in FIG. 10, by controlling the polarization controller 12 corresponding to the selected frequency so that a DGD value on the output side of the DGD compensation unit 14 shown in FIG. 2 may approach 0, the degradation of an optical signal waveform can be compensated for.

FIG. 11 explains the relationship between, for example, a DGD value on the output side of the DGD compensation unit 14 shown in FIG. 2, and an optical signal waveform. As a DGD value decreases, an optical signal with higher amplitude, that is, greater degree of eye opening can be obtained.

Figure 12:
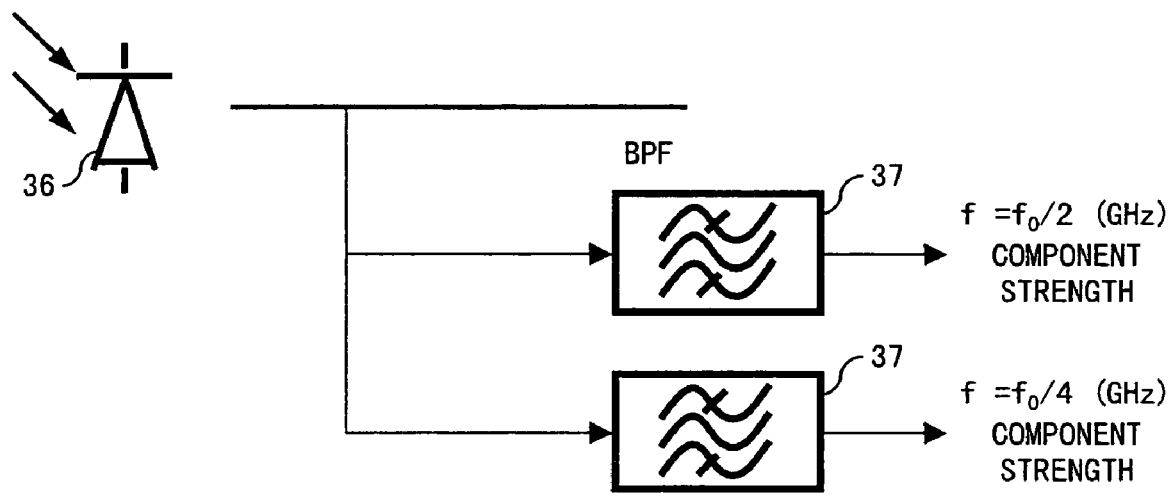
FIG. 12 explains the method of the PMD monitor for detecting the strength of an optical signal component.
Figure 13:
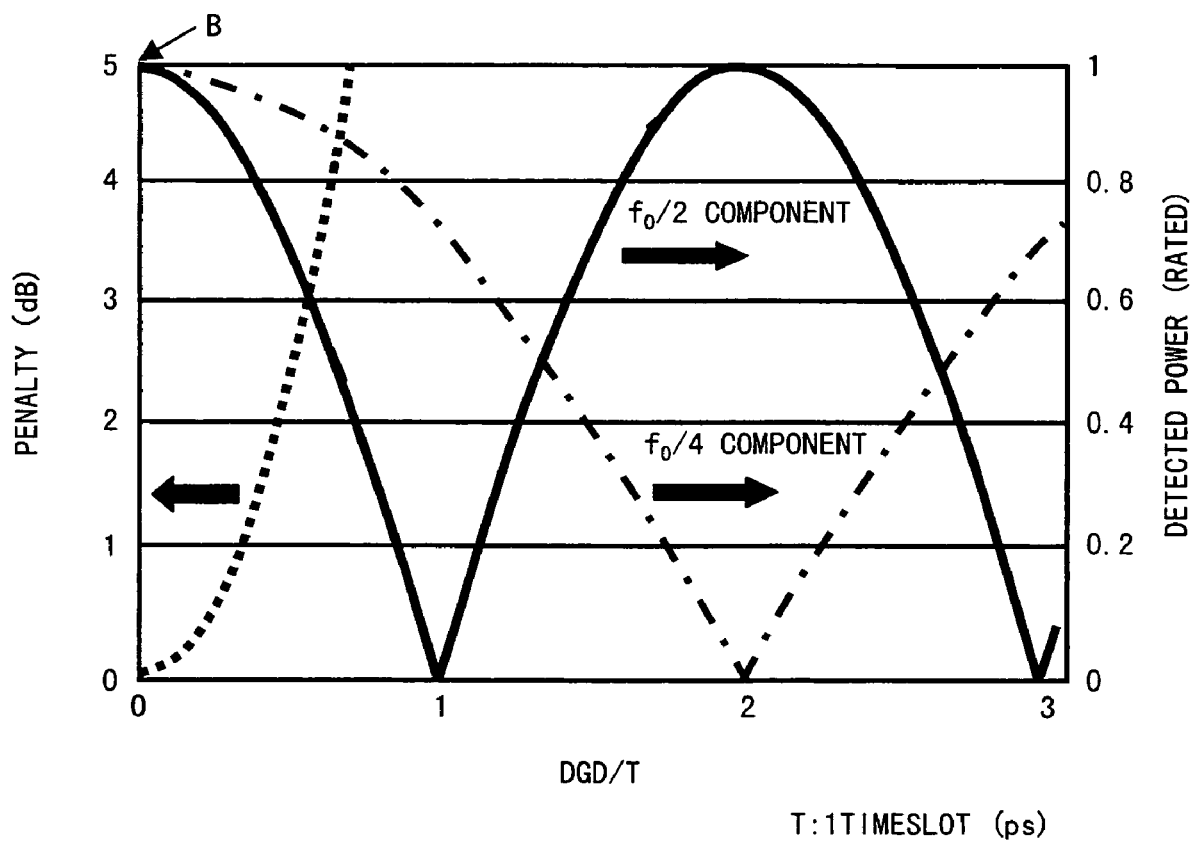
FIG. 13 explains an optical signal waveform compensation method in FIG. 12.

FIGS. 12 and 13 explain a waveform degradation compensation method using the SBH (spectrum barring hold) method for detecting the strength factor of an optical signal for the PMD monitor 17. In FIG. 12, an optical signal converted into an electrical signal by a photo-diode 36 is supplied to two bandpass filters (BPF) 37. The ½ and ¼ frequency components of the frequency $f_0$ of an original optical signal are extracted by these BPFs 37. If the frequency of the original signal is, for example, 40 GHz, components 20 GHz and 10 GHz can be obtained.

In FIG. 13, penalty and power detected by the BPF 37 are shown on the vertical axis against a DGD/T value. A detected power value is, for example, rated and indicated using 1 as a maximum value. In FIG. 13, although component $f_0/2$ (solid line) has two peaks, component $f_0/4$ (one-dot chain line) has only one peak. By controlling the polarization controller 12 shown in FIG. 2 so that both the peak of $f_0/2$ and that of $f_0/4$ may approach point B, the DGD value can be approached to 0. For the polarization mode dispersion compensation by the detection of such signal component strength, see the following reference.

Ohi, Akiyama and Ishikawa, "40 Gbit/s Automatic Polarization Mode Dispersion Compensation Experiment, Technical Report of IEIC, OCS99-99, OPE99-103, LQE99-100 (November 1999)

Figure 14:
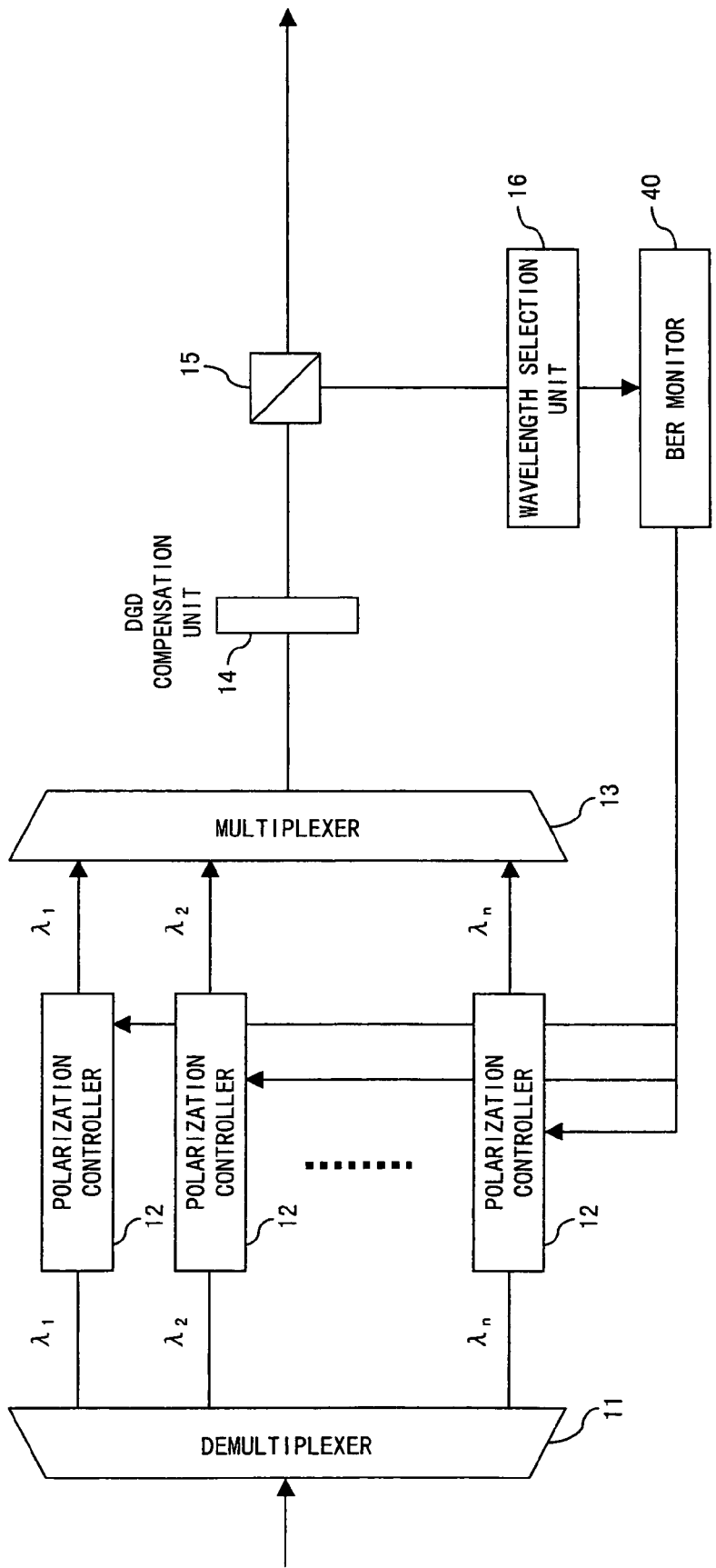
FIG. 14 is a block diagram showing the configuration of a wavelength mode dispersion compensator in which a PMD monitor detects a bit error rate.

FIG. 14 is a block diagram showing the configuration of the polarization mode dispersion compensator with a BER monitor detecting the BER (bit error rate) of an output optical signal, instead of the PMD monitor shown in FIG. 2. This BER monitor 40 detects a BER by converting a single-wavelength optical signal outputted by the wavelength selection unit 16 into an electrical signal, and the degradation of an optical signal waveform can be compensated for by controlling the polarization controller 12 so as to minimize the BER. Although in this example, a BER is detected, instead of PMD monitor 17, the polarization controller can also be controlled by detecting waveform degradation due to polarization mode dispersion, such as the degree of eye opening or the like.

Figure 17:
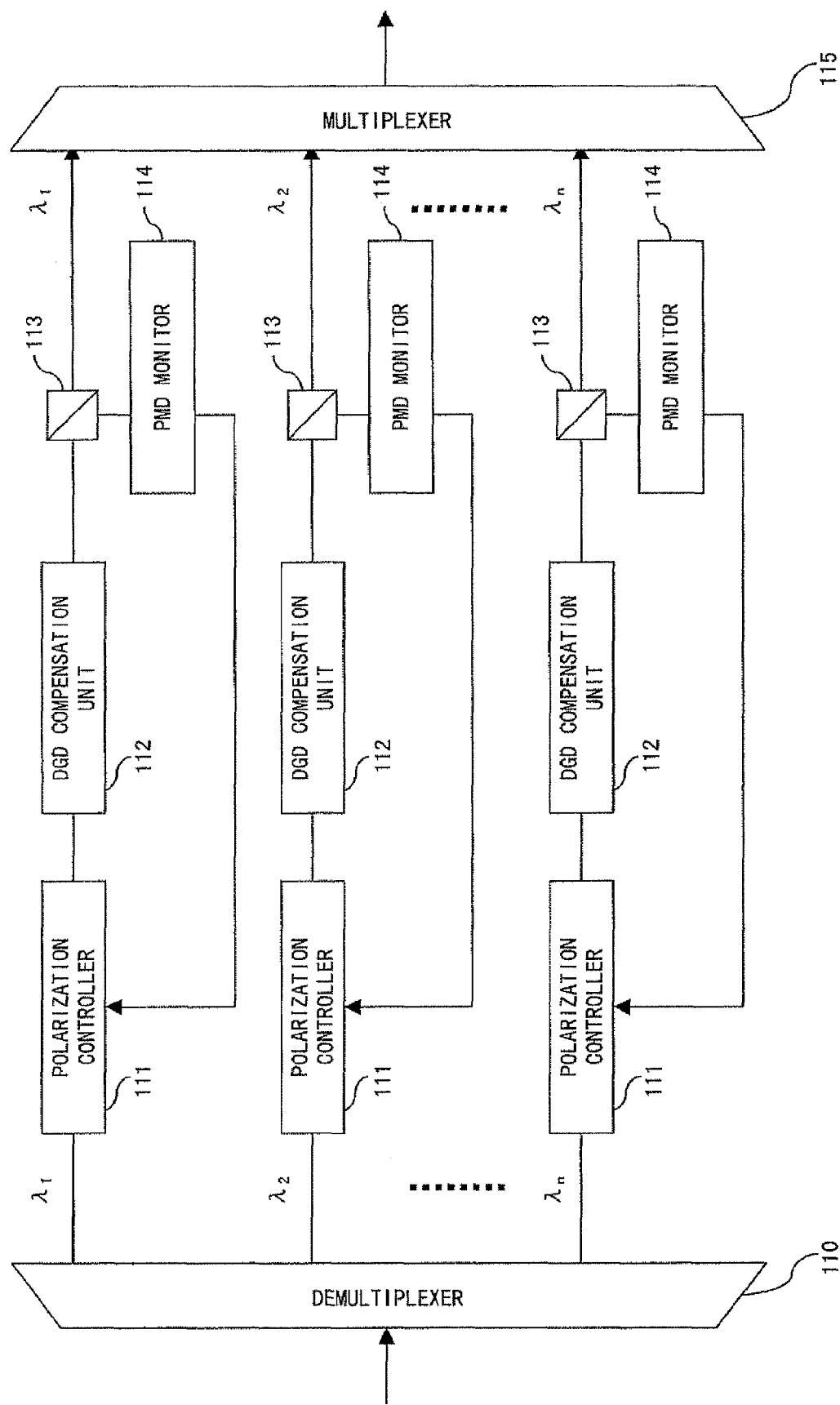
FIG. 17 is a block diagram showing the conventional configuration of the polarization mode dispersion compensator for a multiple wavelength optical multiplex signal.

As described above, in this preferred embodiment, small and inexpensive PMD compensators can be disposed in a transmission line by sharing the DGD compensation unit and PMD monitor, which are conventionally provided for each frequency component in FIG. 17.

For example, a time needed for the DOP monitor used as the PMD monitor to measure the DOP value of a single-wavelength optical signal is several tens of microseconds. However, in PMD compensation control, it takes several hundreds of microseconds to several milli-seconds to perform an operation, based on information from a monitor and to transmit a control signal to each device. By utilizing such a difference between the measurement speed and control speed in PMD compensation of a monitor, the monitor can be shared. For example, if the response time of the PMD compensator is 200 μs or more, the response time of the DOP monitor is 10 μs or less, and wavelengths can be switched in order of 10 μs, using the earlier-mentioned AOTF as the wavelength-variable filter, the DGD compensation unit and PMD monitor can be shared by a 10-wavelength optical multiplex signal.

As to cost, the cost varies depending on the number of wavelengths. However, if the DGD compensation unit and DOP monitor can be shared by ten wavelengths, cost can be reduced to 60% of the conventional one. By increasing the response time of PMD compensation control, cost can be reduced more.

What is claimed is:

1. An optical signal degradation compensator, comprising:
   a demultiplex unit generating demultiplex signals by demultiplexing a wavelength-division multiplexed optical signal into optical signals having a wavelength respectively;
   a plurality of wavelength signal adjustment units controlling polarization states of a plurality of the demultiplex signals to make adjustments related to waveform degradation compensation for a signal made by multiplexing the demultiplex signals;
   a multiplex unit generating a multiplex signal by multiplexing outputs of the plurality of wavelength signal adjustment units;
   a multiplex signal compensation unit compensating for differential group delay between polarization mode components of the multiplex signal outputted by the multiplex unit;
   a wavelength signal selection unit selecting a component with one of a plurality of wavelengths of the demultiplex signal from a part of the output of the multiplex signal compensation unit; and
   a compensation control unit compensating waveform degradation of the multiplex signal output from the multiplex unit, by detecting a polarization mode dispersion of the component corresponding to the wavelength selected by the wavelength signal selection unit and controlling adjustment by the wavelength signal adjustment unit corresponding to the selected wavelength so as to reduce the polarization mode dispersion value.

2. The optical signal degradation compensator according to claim 1, wherein the wavelength signal selection unit comprises a wavelength-variable filter.

3. The optical signal degradation compensator according to claim 1, wherein
   the multiplex signal compensation unit is composed of differential group delay compensation units compensating for differential group delay between polarization mode components of the multiplex signal; and
   the differential group delay compensation unit comprises a polarization maintaining fiber.

4. The optical signal degradation compensator according to claim 1, wherein
   the multiplex signal compensation unit is composed of differential group delay compensation units compensating for differential group delay between polarization mode components of the multiplex signal; and
   the differential group delay compensation unit comprises a birefringence plate.

5. The optical signal degradation compensator according to claim 1, wherein
   the multiplex signal compensation unit is composed of differential group delay compensation units compensating for differential group delay between polarization mode components of the multiplex signal; and
   the differential group delay compensation unit comprises a polarization beam splitter splitting a multiplex signal outputted by the multiplex unit into two orthogonal polarization mode components, a differential delay line generating a fixed differential delay between the split polarization mode components and a polarization multiplexer connected to the output unit of the differential delay line.

6. The optical signal degradation compensator according to claim 1, wherein
   each of the wavelength signal adjustment units is composed of polarization controllers controlling the polarization state of each optical signal; and
   the compensation control unit detects polarization mode dispersion as degree of degradation of the optical signal and controls the polarization controller so as to reduce the polarization mode dispersion.

7. The optical signal degradation compensator according to claim 6, wherein the compensation control unit comprises a DOP (degree of polarization) monitor detecting the polarization mode dispersion by DOP (degree of polarization).

8. The optical signal degradation compensator according to claim 6, wherein the compensation control unit comprises a signal strength monitor detecting the polarization mode dispersion by the strength of an optical signal component.

9. The optical signal degradation compensator according to claim 6, wherein the compensation control unit comprises a BER (bit error rate) detector detecting the polarization mode dispersion by the BER (bit error rate) of the optical signal.

10. An optical signal degradation compensator, comprising:
    a demultiplex means generating demultiplex signals by demultiplexing a wavelength-division multiplexed optical signal into optical signals having different wavelengths respectively;
    a plurality of wavelength signal adjustment means for controlling polarization states of a plurality of the demultiplex signals to make adjustments related to waveform degradation compensation for a signal made by multiplexing the demultiplex signals;
    multiplex means for generating a multiplex signal by multiplexing outputs of the plurality of wavelength signal adjustment means;
    multiplex signal compensation means for compensating for differential group delay between polarization mode components of the multiplex signal outputted by the multiplex means;
    wavelength signal selection means for selecting a component with one of a plurality of wavelengths of the demultiplex signal from a part of the output of the multiplex signal compensation means; and
    compensation control means for compensating waveform degradation of the multiplex signal output from the multiplex unit, by detecting a polarization mode dispersion of the component corresponding to the wavelength selected by the wavelength signal selection means and controlling adjustment by the wavelength signal adjustment means corresponding to the selected wavelength so as to reduce the polarization mode dispersion value.

* * * * *